Sept. 1, 1959  K. A. ANDERSON  2,902,160
SEPARATION APPARATUS
Filed April 23, 1956  2 Sheets-Sheet 1

INVENTOR
KENNETH A. ANDERSON
BY
Pollard, Johnston, Smyth & Robertson
ATTORNEYS

Sept. 1, 1959   K. A. ANDERSON   2,902,160
SEPARATION APPARATUS
Filed April 23, 1956   2 Sheets-Sheet 2
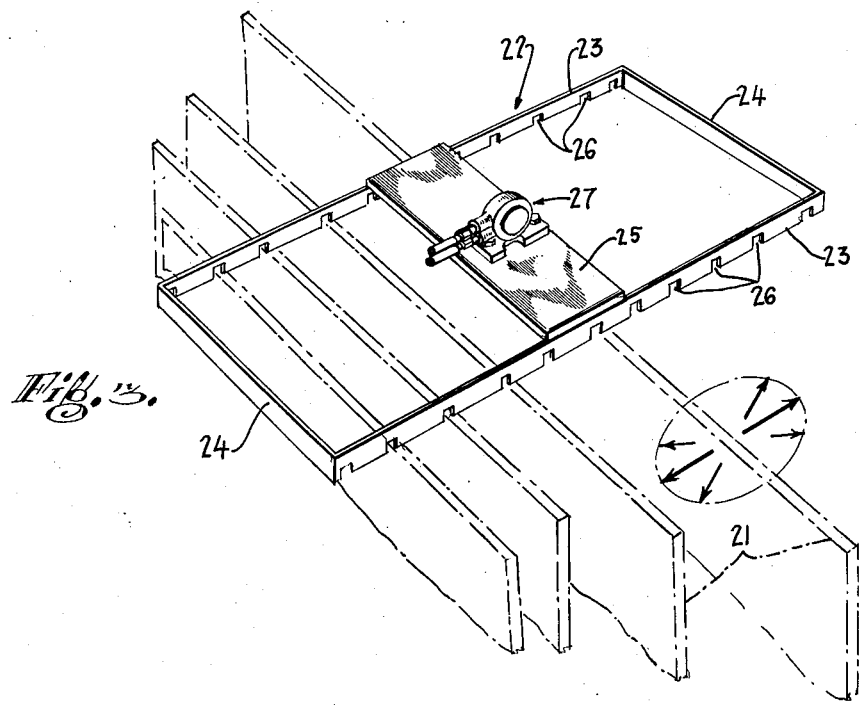
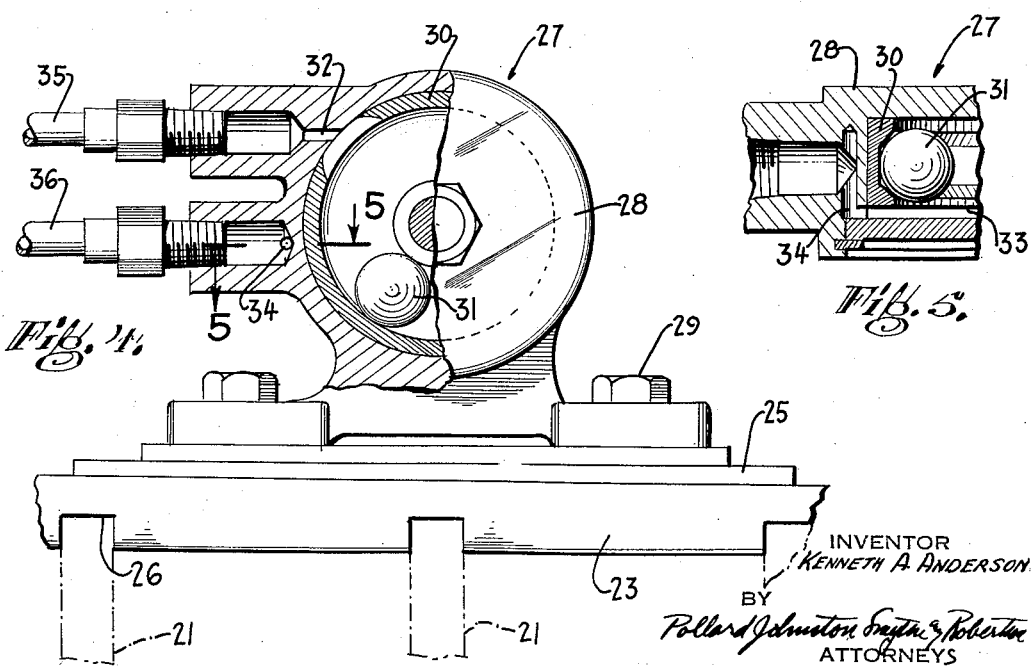
INVENTOR
KENNETH A. ANDERSON
BY
Pollard, Johnston, Smyth & Roberton
ATTORNEYS United States Patent Office 2,902,160
Patented Sept. 1, 1959

2,902,160

SEPARATION APPARATUS

Kenneth A. Anderson, Silvis, Ill., assignor to American Machine and Metals, Inc., New York, N.Y., a corporation of Delaware Application April 23, 1956, Serial No. 580,075

2 Claims. (Cl. 210—388)

This invention relates generally to filter apparatus, and more particularly is directed to improvements in pressure-leaf filters wherein a plurality of filter leaves are normally operable in an enclosure containing the slurry or the like from which a liquid is to be filtered, and either pressure is applied to the enclosure or a vacuum is applied to the manifold with which the leaves communicate, so that liquid is filtered through the leaves into the manifold and filter cake is deposited on the outside surfaces of the filter leaves.

In filter apparatus of the described character, each filter leaf generally includes a frame extending around the perimeter thereof and carrying a nozzle or nipple adapted to be received in a corresponding receptacle of the manifold so that the leaf may be supported by the latter. The frame supports spaced wire mesh screens through which the filtrate or liquid is filtered into the interior of the leaf, either with the aid of diatomaceous earth, asbestos, purified cellulose, activated carbons and clays, and other filter aids deposited on the screens as a pre-coating, or with the aid of a cloth bag enveloping the leaf, when a cloth filter medium is required.

Whatever filter medium is employed, such medium co-operates with solids from the slurry deposited, as a cake, on the outside surfaces of the filter leaves to filter the liquid so that only the latter passes into the interior of the leaves. However, as the filtering operation continues, the thickness of the cake deposited on the filter leaves increases and it becomes correspondingly more difficult for the applied pressure or vacuum to promote the passage of the liquid through the cake into the interior of the leaves. In many cases, if is still the practice to periodically interrupt the filtering operation and to remove some or all of the caked solids that have been deposited on the leaves, either by bodily removing the battery of filter leaves from the enclosure and manually scraping the cake therefrom, or by supplying compressed air to the manifold so that the air passing outwardly through the screens and filter medium would remove at least some of the filter cake from the leaves.

However, it has been found that the removal of accumulated cake from the filter leaves can be more efficaciously achieved by subjecting the filter leaves to high frequency vibrations, particularly in a plane normal to the planes of the leaves and preferably while the filter leaves are immersed in liquid. Accordingly, it is an object of the present invention to provide an arrangement in pressure-leaf filters for subjecting the filter leaves to high frequency vibrations of the above character, and particularly wherein a rotary vibrator is employed to produce the desired vibrations in all directions within the plane normal to the planes of the filter leaves.

Another object is to provide an arrangement for vibrating the filter leaves in the above described manner and which is simple in construction and may be adapted to axiating designs of pressure-leaf filters without requiring substantial alteration or modification of the latter.

In accordance with an aspect of this invention, an arrangement or assembly for subjecting the filter leaves of a pressure-leaf filter to high frequency vibrations includes a frame resting upon the upper edges of the several filter leaves and notched to receive the latter so that vibration of the frame in a plane normal to the planes of the leaves will be transmitted to the latter, and a rotary vibrator secured on frame and producing vibrations in a plane normal to said planes of the filter leaves. For the purposes of the present invention, the rotary vibrator may include a hollow body defining a circular raceway in the interior thereof and having a tangential inlet passageway and an opening or openings through which air may escape from the interior of the body. A ball or roller is movable along the circular raceway and is driven at high speed by fluid under pressure, for example, compressed air, admitted to the interior of the body through the tangential inlet passageway.

The above, and other objects, features and advantages of the invention, will be apparent in the following detailed description of an illustrative embodiment which is to be read in connection with the accompanying drawings forming a part hereof, and wherein:

Fig. 3 is a perspective view of the assembly for vibrating the filter leaves in accordance with this invention and representing the character of the vibrations that are thereby produced;

Fig. 4 is an enlarged side elevational view, partly broken away and in section, of a rotary vibrator that may be employed to subject the filter leaves to high frequency vibrations in accordance with the present invention; and Fig. 5 is a fragmentary sectional view along the line 5—5 of Fig. 4.

Figure 1:
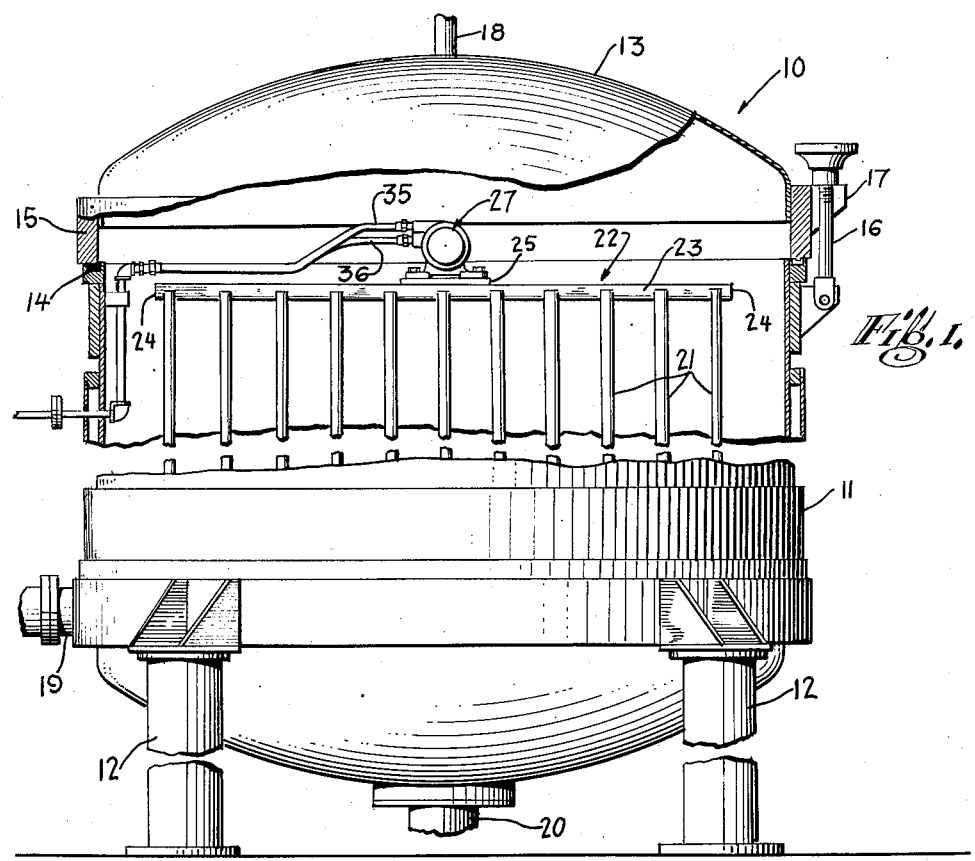
Fig. 1 is a side elevational view of a pressure-leaf filter embodying the present invention, with part of the enclosure or tank of the filter being broken away to expose the assembly for effecting the high frequency vibration of the filter leaves.
Figure 2:
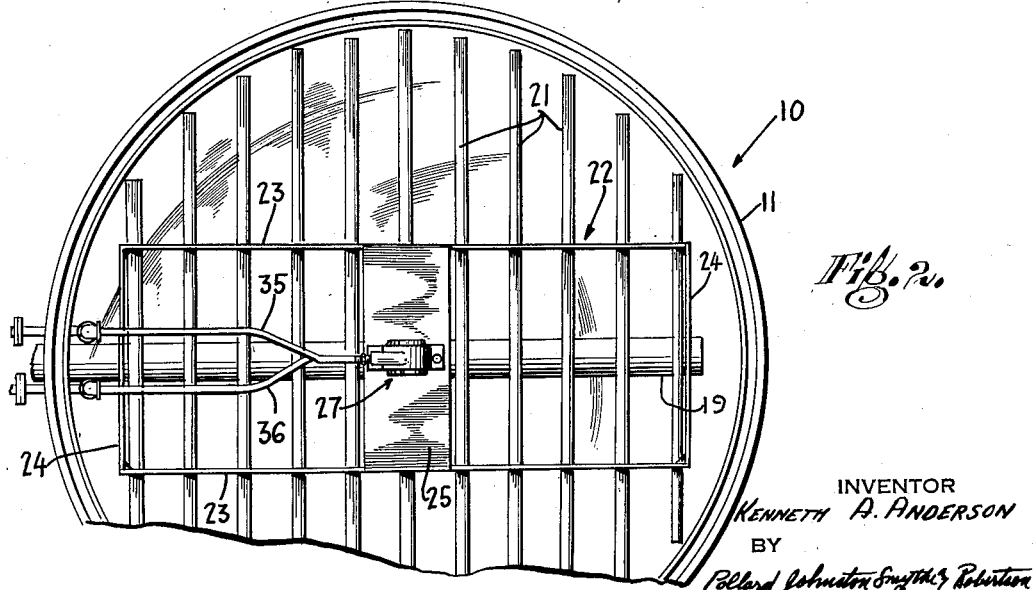
Fig. 2 is a partial top plan view of the filter of Fig. 1, but with the cover thereof being removed.

Referring to the drawings in detail, and initially to Figs. 1 and 2 thereof, where a pressure leaf filter embodying this invention is generally identified by the reference numeral 10, it will be seen that the filter 10 includes a tank or enclosure 11 which extends vertically and is open at its upper end but which may extend horizontally and be open at one end. The tank 11 may be supported at a convenient height above the floor by suitable legs 12 and is provided with a removable cover or closure 13 for sealing the open end thereof. A suitable sealing gasket 14 may be provided on the upper edge of the tank 11 for engagement by a rim 15 of the cover, and securing bolts 16 are mounted on the tank, at the upper end of the latter, for engagement with projections or lugs 17 extending from the rim 15 to hold the cover tightly against the upper end of the tank.

The prefilt, for example, a slurry of liquid and solids that are to be separated, may be introduced into the tank 11 through an inlet pipe 18 passing through the cover 13, and a manifold 19 (Fig. 1) extends across the tank 11 adjacent the bottom of the latter and projects from the tank to convey the liquid constituents of the prefilt out of the tank after the liquid has been separated from the accompanying solids. Further, a conduit 20 extends from the bottom of the tank 11 for draining any liquid residue that may remain in the tank after a series of filtering operations.

Within the tank 11, the manifold 19 supports a series of parallel, upstanding filter leaves 21 each of which, as is usual, may include a frame extending around the perimeter thereof and carrying a nozzle or nipple at the bottom received in a corresponding receptacle or opening of the manifold, and spaced wire mesh screens supported by the leaf frame and through which the filtrate or liquid is filtered into the interior of the leaf, and thence into the manifold 19, either with the aid of diatomaceous earth, asbestos, purified cellulose activated carbons and clays, and other filter aids deposited on the screens as a precoating, or with the air of a cloth bag enveloping the leaf, when a cloth filter medium is required.

During a filtering operation, prefilt is supplied to tank 11 through pipe 18 and either pressure is applied to the latter or vacuum is applied to the manifold 19, in the usual manner, to cause the liquid constituents of the prefilt to pass through the filter medium and the screens of each leaf 21 into the interior of the latter and then into the manifold 19 for withdrawal by the latter from the tank 11.

As the liquid passes into the interior of the leaves 21, the solids in the prefilt accumulate, in the form of filter cake, on the outside surfaces of the filter leaves so that the liquid being separated must also pass through the accumulated filter cake before reaching the interior of the leaves 21. It is apparent that, as the filter cake builds up on the filter leaves, increased resistance is interposed to the flow of liquid into the interior of the filter leaves and, at some point, the applied pressure or vacuum for promoting the flow of liquid into manifold 19 will become ineffective to cause filtering at a practically useful rate. When this occurs, some or all of the accumulated filter cake must be removed from the outside surfaces of the filter leaves 21.

In accordance with the present invention, the desired removal of filter cake from the leaves 21 is achieved by subjecting the latter to high frequency vibrations in all directions in a plane, for example, as produced by a rotary vibrator, preferably with the plane of the vibrations being normal to the parallel planes of the several filter leaves. Further, it has been found that such high frequency vibration of the filter leaves is most effective to remove filter cake from the latter if the leaves 21 are immersed in liquid at the time when they are vibrated.

In the illustrated embodiment of the invention, an assembly provided for subjecting the filter leaves 21 to the desired high frequency vibration is generally identified by the reference numeral 22 and includes a generally rectangular frame made up of side pieces 23 and end pieces 24 extending between the latter. A plate 25 extends laterally between the side pieces 23, and the pieces 23 and 24 and the plate 25 are welded, or otherwise rigidly secured together, in the illustrated relationship to form an integral or rigid frame structure that can rest upon the upper edges of the filter leaves 21 with the side pieces 23 spanning the spaces between adjacent filter leaves and extending normal to the planes of the latter. As seen in Fig. 3, the side pieces 23 have laterally aligned series of downwardly opening notches 26 in the lower edges thereof which are spaced apart by distances equal to the spacing between adjacent filter leaves so that the notches 26 are adapted to receive the upper edge portions of the filter leaves.

A rotary vibrator which is generally identified by the reference numeral 27 is mounted on the plate 25 and is adapted to produce high frequency vibrations in all directions within a plane extending normal to the planes of the several filter leaves 21, as represented in Fig. 3. In the illustrated embodiment, the plane of the produced vibrations is vertical, but it is to be understood that it may be otherwise, for example, horizontal.

As seen in Figs. 4 and 5, the rotary vibrator 27 may include a hollow body or casing 28 secured to the plate 25, as by bolts 29, an annular member 30 within the body and defining a circular raceway, and a rolling member 31, for example, in the form of a spherical ball, as shown, or a cylindrical roller, which rides around the raceway 30. The rolling member 31 is driven around the raceway 30 at high speed by fluid under pressure, for example, compressed air, introduced into the body 28 through a tangential inlet passageway 32 (Fig. 4), and, as shown in Fig. 5, the raceway 30 is open at one side, as at 33, and an outlet passageway 34 extends from the open side of the raceway to receive the compressed air discharged from the latter. Suitable piping 35 and 36 extend from the inlet passageway 32 and the outlet passageway 34, respectively, to the outside of the tank 11 and are there respectively connected to a source of compressed air (not shown) and opened to the atmosphere. Suitable valves (not shown) may be interposed in the piping 35 and 36 to control the supply of compressed air to the vibrator 27 so that the latter may be operated only when desired.

It is apparent that as the member 31 rolls around the circular raceway 30 at high speed, the progressive changes in the direction of movement of the mass of the rolling member produce high frequency vibrations in all directions in the plane of the circular path followed by the member 31. Such high frequency vibrations are transmitted by plate 25 to side pieces 23 which in turn transmit the vibrations to the filter leaves by reason of the reception of the upper edges of the latter in the notches 26.

The high frequency vibrations transmitted to each filter leaf 21 in all directions within a plane normal to the plane of the leaf loosen the filter cake on the latter so that the filter cake disintegrates and falls from the leaf or is carried away by liquid in which the leaf is immersed during vibration.

It is apparent that the installation of the vibrator assembly 22 in the filter 10 requires a minimum alteration of the existing structure, specifically, only the provision of openings in the tank 11 for the piping 35 and 36. Further, the vibrator assembly 22 makes possible the effective in place cleaning of the filter leaves without resort to the tedious and time consuming manual scraping of the filter cake from the leaves, and the cleaning achieved by the vibrator assembly embodying this invention is more rapid and efficient than that achieved merely by the introduction of compressed air into the manifold 19 even though the latter method may by used in conjunction with the high frequency vibration. It is also to be noted that, since the vibrator assembly 22 merely rests upon the filter leaves, the assembly 22 can be easily removed when it becomes necessary to replace one or more of the filter leaves.

Although an illustrative embodiment of the invention has been described in detail herein and illustrated in the accompanying drawings, it is to be understood that the invention is not limited to that particular embodiment, and that various changes and modifications may be effected therein without departing from the scope or spirit of the invention, except as defined in the appended claims.

What is claimed is:

1. In a pressure leaf filter; the combination of a tank adapted to receive prefilt, a manifold extending out of said tank, a plurality of upstanding, parallel filter leaves in said tank and supported, at their lower ends, on said manifold with the latter in communication with the interiors of said leaves to receive filtrate from the latter in response to the presence of a higher pressure in said tank than in said manifold, a frame resting on the upper ends of all of said leaves and having spaced apart side pieces extending laterally with respect to the planes of said leaves and formed with downwardly opening notches receiving the upper end edges of the leaves, a cross-piece connecting said side pieces adjacent their centers, and rotary vibrating means including a hollow body having a circular raceway therein and fixed on said cross-piece with the plane of said raceway extending normal to said planes of the leaves, a rolling member movable along said circular raceway and means for directing a flow of pressure fluid tangentially into said raceway to propel said rolling member along the latter at high speed thereby to produce high frequency vibrations in all directions in said plane of the raceway for removing filter cake from said leaves.

2. A vibrator assembly for removing filter cake from the filter leaves of a pressure leaf filter; said assembly comprising a rectangular frame including elongated spaced apart side members adapted to rest on the edges of the filter leaves while extending normal to the planes of the latter and having downwardly opening notches for receiving the leaf edges, a cros-piece connecting said side pieces adjacent their centers, and rotary vibrating means fixed on said cross-piece and operative to produce high frequency vibrations in all directions within its plane of rotation for transmission by said side members to the filter leaves.

References Cited in the file of this patent
UNITED STATES PATENTS

| | | |
|---|---|---|
| 2,460,416 | Goodrich | Feb. 1, 1959 |
| 2,480,320 | Carrier | Aug. 30, 1949 |
| 2,520,044 | Mason | Aug. 22, 1950 |
| 2,528,319 | Peterson | Oct. 31, 1950 |
| 2,601,156 | Lax | June 17, 1952 |

UNITED STATES PATENT OFFICE

CERTIFICATE OF CORRECTION

Patent No. 2,902,160                                      September 1, 1959

Kenneth A. Anderson

It is hereby certified that error appears in the printed specification of the above numbered patent requiring correction and that the said Letters Patent should read as corrected below.

Column 3, line 6, for "air" read -- aid --; column 5, line 7, for "cros-piece" read -- cross-piece --; column 6, line 6, list of references cited, for "Feb. 1, 1959" read -- Feb. 1, 1949 --.

Signed and sealed this 1st day of March 1960.

(SEAL)
Attest:
KARL H. AXLINE
Attesting Officer

ROBERT C. WATSON
Commissioner of Paten